United States Patent

[11] 3,628,738

| [72] | Inventors | Dennis Mitchell;<br>Arthur Frank Payne, both of Park House,<br>Courtenay Park, Newton Abbot,<br>Devonshire, England |
|---|---|---|
| [21] | Appl. No. | 765,294 |
| [22] | Filed | Oct. 7, 1968 |
| [45] | Patented | Dec. 21, 1971 |

[54] TREATMENT OF CLAYS
7 Claims, 1 Drawing Fig.

[52] U.S. Cl. ................................................. 241/16,
106/288 B, 106/308 N, 106/309, 241/18
[51] Int. Cl. ............................................................. B02c 1/00
[50] Field of Search .......................................... 106/308 N,
288 I, 309, 308 Q; 241/18, 16

[56] References Cited
UNITED STATES PATENTS

| 2,460,546 | 2/1949 | Stephanoff | 106/309 X |
|---|---|---|---|
| 2,531,427 | 11/1950 | Hauser | 106/308 N UX |
| 2,622,987 | 12/1952 | Ratcliffe | 106/308 N X |
| 2,982,665 | 5/1961 | Wilcox | 106/308 N |
| 3,234,006 | 2/1966 | Sawyer et al. | 106/308 N X |
| 3,290,243 | 12/1966 | Sawyer | 106/288 I X |
| 3,309,211 | 3/1967 | Weiss | 106/288 I X |

*Primary Examiner*—Tobias E. Levow
*Assistant Examiner*—H. M. S. Sneed
*Attorneys*—Emory L. Groff and Emory L. Groff, Jr.

ABSTRACT: A method of treating clay which is to be dewatered and disintegrated, particularly for use in rubber compounds and as an anticaking agent in fertilizers, in which an organic coating substance is added to the clay before dewatering or, if the substance is of a kind which might decompose at the dewatering temperature, after dewatering, and the mixture of clay and the substance is reduced to a fine powder.

PATENTED DEC 21 1971 3,628,738
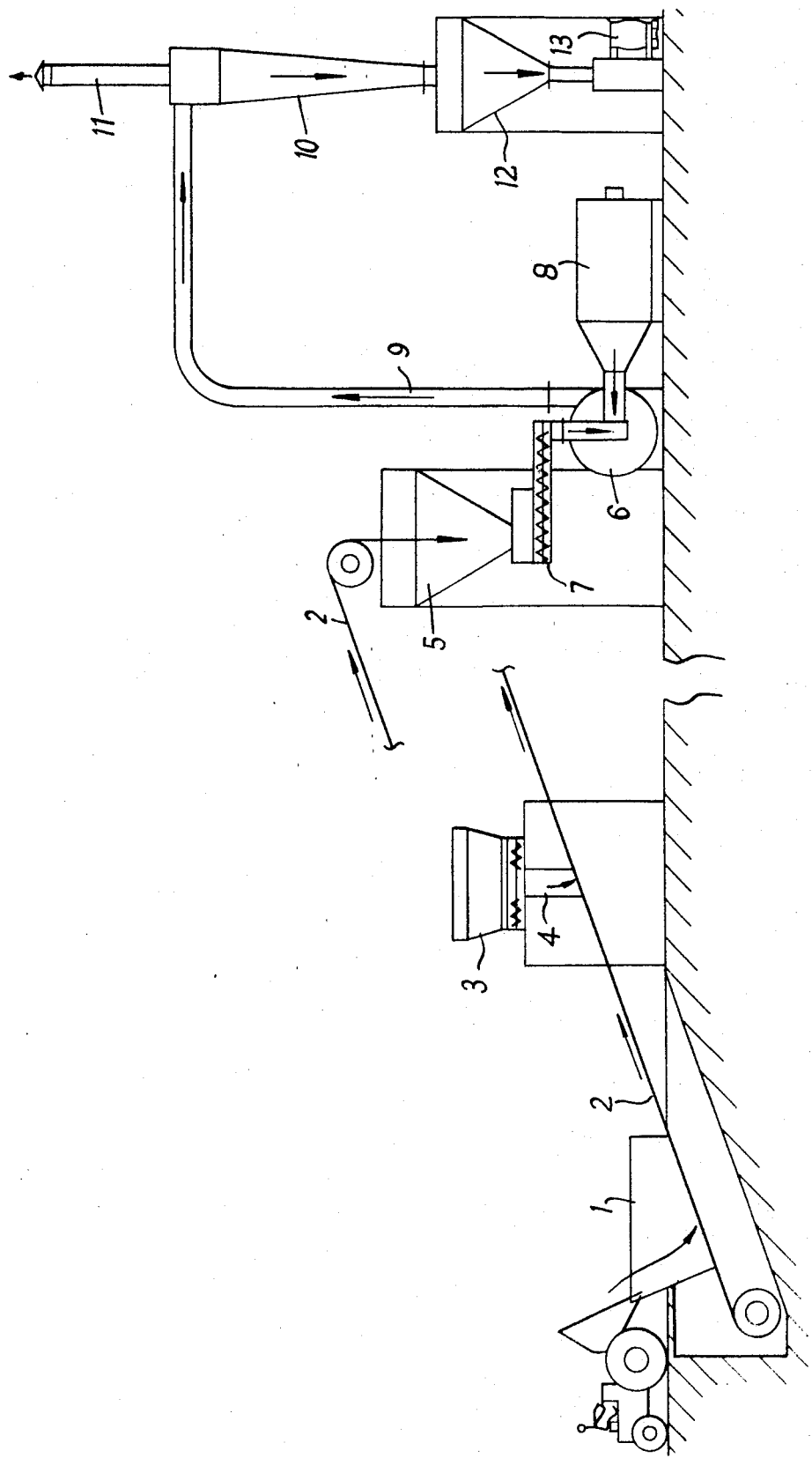

TREATMENT OF CLAYS

This invention relates to the treatment of clays, and more particularly to the treatment of clays such as ball clay and china clay in shredded form to render them suitable for use in rubber compounds and as anticaking agents in fertilizers.

Clays used in rubber compounds or as anticaking agents in fertilizers are required to be in a fine state of division, that is, in the form of a very fine powder. To this end the clay in the form of shreds is compacted and fed to a mechanical disintegrator which reduces the shreds to a fine powder or dust which, when separated out in a cyclone, is suitable for the purposes specified. Usually the clay shreds are moist, in which case they are dewatered. Dewatering and disintegration can sometimes be done simultaneously, for example in a pulverizing-and-drying apparatus known as an attritor.

When clays are used in rubber compounds and as anticaking agents in fertilizers they are mixed with an organic substance such as, for example, an aliphatic or aromatic amine, to diminish the amount of water vapor absorbed by the clay by coating the exterior of the particles of powdered clay with the organic substance. Hitherto, when coating the dry clay, the organic substance has been added to the clay after it has been pulverized and dried.

It is an object of the present invention to provide a method of treating clay in which an organic coating substance for the clay is caused to form a more effective coating on the disintegrated clay particles than hitherto.

The invention consists of a method of treating clay, particularly for use in rubber compounds and as an anticaking agent in fertilizers, in which the clay is to be dewatered, comprising the steps of adding to the clay, either prior to or subsequent to dewatering, an organic coating substance and thereafter reducing the mixture of clay and the coating substance to a fine powder.

If the organic substance is chemically stable at the dewatering temperature for the clay, the organic substance is preferably added prior to dewatering. If, however, the organic substance is liable to chemical decomposition at the dewatering temperature then the dewatering is carried out prior to mixing in the organic substance.

Where dewatering is to be carried out after mixing in the organic substance this substance may be added to the moist shredded clay in the form of a dry powder, or flakes, or in the form of a slurry mixed with water. Where a slurry is used the organic substance may be added to the shredded clay while it is being conveyed to a location at which it is simultaneously dewatered and reduced to a fine powder. The simultaneous dewatering and reduction to a fine powder may be carried out by passing a heated gas such as air and the mixture of clay with the organic substance through a disintegrator capable of reducing the mixture to a fine powder.

It is found that by adding the organic substance to the clay prior to reducing to powder the particles of powdered clay are much more effectively coated with the organic substance. Consequently the powder is much less liable to form agglomerates and lumps while in stock prior to being used for its ultimate purpose.

The organic substance may be any aliphatic or aromatic amine hitherto mixed with clay to render the clay suitable for use in a rubber compound or as an anticaking agent in a fertilizer. One such organic additive is octadecylamine which may preferably be used in an amount of up to 2.5 percent by weight based on the weight of the moist clay, and preferably in the range 0.5 to 2.5 percent. Other suitable organic coating substances are hexamine, lignosulphonic acid and calcium stearate.

The invention will now be illustrated with reference to the accompanying diagrammatic drawing which shows an arrangement of apparatus for carrying out one embodiment of the method of the invention.

Referring to the drawings, shredded moist clay is dumped into a hopper 1, the floor of which is constituted by a flight 2 of a conveyor belt. When the clay is dumped into the hopper with the flight 2 of the belt in movement, the shredded clay is spread out in a band on the flight. It is thus conveyed under another hopper 3 with a discharge pipe 4 having an opening close to the belt flight. This hopper has a screw feed between the hopper container and the discharge pipe. This serves to feed powdered or flaked organic substances from the hopper 3 into the discharge pipe and thence on to the moving band of moist clay to mix with the clay. Alternatively, if the organic substance is mixed with the clay as an aqueous slurry the conveyor prevents the organic substance and water in the slurry from separating while the slurry is being fed to the moving band of moist shredded clay so that the organic substance is distributed uniformly over the layer of clay.

The layer of clay with the organic substance included therein is then discharged into a feed hopper 5 for a disintegrator device 6 of an attritor. This feed hopper has a worm feed 7 at its discharge end and this worm feed compacts and at the same time feeds the moist clay shreds to the feed conduit for the disintegrator device 6 of the attritor. Heated air is fed into this feed conduit by an air heater 8. After passing through the disintegrator the clay is reduced to a fine powder and simultaneously dewatered. The pulverized clay, consisting of very small particles each coated with the organic substance, is conveyed by the air used for dewatering up a vertical discharge pipe 9 connected to a cyclone 10 fitted with an air exhaust conduit 11. In the cyclone, the clay particles and airstream are separated. The dust comprising the coated clay particles drops down the cyclone into a hopper 12 for feeding bags 13 whilst the air escapes vertically upwards through the air exhaust conduit 11 at the top of the cyclone 10.

We claim:

1. A method of treating shredded clay which is to be dewatered and reduced to a powder, part for use in rubber compounds and as an anticaking agent in fertilizers, comprising the steps of adding an organic coating substance selected from the group consisting of aliphatic and aromatic amines to the shredded clay in an amount up to 2.5 percent of the weight of the shredded clay, and reducing the mixture of shredded clay and coating substance to a fine powder.

2. A method as claimed in claim 1 in which the organic coating substance is mixed with the clay prior to dewatering.

3. A method as claimed in claim 1 in which the organic coating substance is added in the form of an aqueous slurry.

4. A method as claimed in claim 3 comprising the step of adding the slurry when conveying the shredded clay to a location in which it is to be dewatered and reduced to a fine powder.

5. A method as claimed in claim 4 comprising the step of simultaneously dewatering the mixture of shredded clay and the organic coating substance and reducing the mixture to a fine powder by passing the mixture, with a heated gas, such as air, through a disintegrator capable of reducing the mixture to a fine powder.

6. A method of treating shredded, dewatered clay which is to be reduced to a powder, part for use in rubber compounds and as an anticaking agent in fertilizers comprising the steps of adding an organic coating substance selected from the group consisting of aliphatic and aromatic amines to the shredded, dewatered clay in an amount of up to 2.5 percent of the weight of the clay, and reducing the mixture of shredded clay and coating substance to a fine powder.

7. A method as claimed in claim 6 in which the organic coating substance is octadecylamine.

* * * * *